United States Patent
Hagstrand et al.

(10) Patent No.: US 11,827,774 B2
(45) Date of Patent: Nov. 28, 2023

(54) POLYMER BLEND COMPOSITION FOR WIRE AND CABLE APPLICATIONS WITH ADVANTAGEOUS ELECTRICAL PROPERTIES

(71) Applicant: BOREALIS AG, Vienna (AT)

(72) Inventors: Per-Ola Hagstrand, Stenungsund (SE); Thomas Gkourmpis, Stenungsund (SE)

(73) Assignee: BOREALIS AG, Vienna (AT)

( * ) Notice: Subject to any disclaimer, the term of this patent is extended or adjusted under 35 U.S.C. 154(b) by 232 days.

(21) Appl. No.: 16/771,303

(22) PCT Filed: Dec. 18, 2018

(86) PCT No.: PCT/EP2018/085681
§ 371 (c)(1),
(2) Date: Jun. 10, 2020

(87) PCT Pub. No.: WO2019/121807
PCT Pub. Date: Jun. 27, 2019

(65) Prior Publication Data
US 2021/0206951 A1  Jul. 8, 2021

(30) Foreign Application Priority Data
Dec. 18, 2017 (EP) .................... 17208243

(51) Int. Cl.
| C08L 23/06 | (2006.01) |
| C08L 23/08 | (2006.01) |
| C08L 23/14 | (2006.01) |
| H01B 13/24 | (2006.01) |
| H01B 3/44 | (2006.01) |
| C08L 53/00 | (2006.01) |
| C08L 23/12 | (2006.01) |
| H01B 9/00 | (2006.01) |

(52) U.S. Cl.
CPC .............. *C08L 23/06* (2013.01); *C08L 23/08* (2013.01); *C08L 23/12* (2013.01); *C08L 23/14* (2013.01); *C08L 53/00* (2013.01); *H01B 3/441* (2013.01); *H01B 13/24* (2013.01); *C08L 2203/202* (2013.01); *C08L 2205/025* (2013.01); *C08L 2205/03* (2013.01); *C08L 2207/066* (2013.01); *H01B 9/00* (2013.01)

(58) Field of Classification Search
CPC .......... C08L 23/10; C08L 23/12; C08L 23/14; C08L 23/04; C08L 23/06; C08L 23/08; C08L 23/0815; C08L 2205/03
See application file for complete search history.

(56) References Cited

U.S. PATENT DOCUMENTS

| 4,510,031 | A  | 4/1985  | Matsumura et al. |
| 7,608,668 | B2 | 10/2009 | Li Pi Shan et al. |
| 7,858,706 | B2 | 12/2010 | Arriola et al. |
| 7,858,707 | B2 | 12/2010 | Arriola et al. |
| 2013/0087362 | A1 | 4/2013 | Nilsson et al. |

FOREIGN PATENT DOCUMENTS

| CN | 1399660 A | 2/2003 |
| CN | 103289180 A | 9/2015 |
| CN | 106366545 A | 2/2017 |
| GB | 2152515 A * | 8/1985 |
| WO | 1993/008222 A1 | 4/1993 |
| WO | 200138433 A | 5/2001 |
| WO | 2003/026522 A2 | 4/2003 |
| WO | 2011/113686 A1 | 9/2011 |
| WO | 2011163187 A | 12/2011 |
| WO | WO2011163187 A1 * | 12/2011 |
| WO | 2012/150285 A1 | 11/2012 |
| WO | 2016/066619 A1 | 5/2016 |
| WO | 2016/188818 A1 | 12/2016 |
| WO | 2016/200600 A1 | 12/2016 |
| WO | 2017/085057 A1 | 5/2017 |
| WO | 2017/103511 A1 | 6/2017 |

OTHER PUBLICATIONS

Machine translation of CN103289180 (Year: 2023).*
A. G. Andreopoulos et al: "Compatibilizers for Low Density Polyethylene/Polypropylene Blends", Journal of Macromolecular Science , Part A—Pure and Applied Chemistry., vol. 36, No. 9, (Aug. 23, 1999), pp. 1113-1122.
Mingbo Yang et al: "Low Density Polyethylene-Propylene Blends: Part 2—Strengthening and Toughening with Copolymers", Plastics, Rubber & Composites: Macromolecular Engineering, vol. 32, No. 1, (Jan. 1, 2003), pp. 27-31.
Yi Liu et al: "Melt Rheological Properties of LLDPE/PP Blends Compatiilized by Cross-Linked LLDPE/PP Blends (LLDPE-PP)", Polymer-Plastics Technology and Engineering, vol. 52, No. 8, (Jun. 21, 2013), pp. 841-846.
Shu-Cai Li et al: "Effect of Cross-Linked LLDPE/PP blend (LLDPE-PP) as Compatibilizer on Morphology, Crystallization Behavior and Mechanical Property of LLDPE/PP Blends", Journal of Applied Polymer Science, vol. 121, No. 5, (Mar. 24, 2011), pp. 2614-2620.
Green C et al: "Thermoplastic Cable Insulation Comprising a Blend of Isotactic Polypropylene and a Propylene-Ethylene Copolymer", IEEE Transactions on Dielectrics and Electrical Insulation, IEEE Service Center, Piscataway, NJ, US, vol. 22, No. 2, (Apr. 1, 2015), 10 pages.

(Continued)

*Primary Examiner* — Irina S Zemel
*Assistant Examiner* — Jeffrey S Lenihan
(74) *Attorney, Agent, or Firm* — Meunier Carlin & Curfman LLC

(57) ABSTRACT

The invention provides a polymer composition comprising a low density polyethylene (LDPE); polypropylene (PP) and a compatibiliser. The invention also relates to cables comprising said polymer composition and the use of the polymer composition in the manufacture of an insulation layer of cable.

14 Claims, 1 Drawing Sheet

(56) References Cited

OTHER PUBLICATIONS

International Search Report and Written Opinion issued in related International Application No. PCT/EP2018/085681 dated Feb. 25, 2019, 19 pages.
R. Klimesche et al., "Polyethylene: High-pressure", Encyclopedia of Materials: Science and Technology, 2001 Elsevier Science Ltd. p. 7181-7184.
Encyclopedia of Polymer Science and Engineering, vol. 6 (1986), pp. 383-410.
Pölt et al. "Characterization of Modified Polypropylene by Scanning Electron Microscopy", J. Appl. Polym. Sci. 78 (2000) 1152-61.
Li, "Plastic Processing Technology Application Handbook", China Material Publishing House, Oct. 1997, p. 26.
Liang, "Functional Surfactants", China Light Industry Press, Apr. 2002, pp. 454-456.
Vasile, "Polyolefin Handbook (2nd Edition)", translated by Li Yang, Qiao Jinliang, Chen Wei, etc., China Petrochemical Press, Sep. 2005, p. 637.

\* cited by examiner

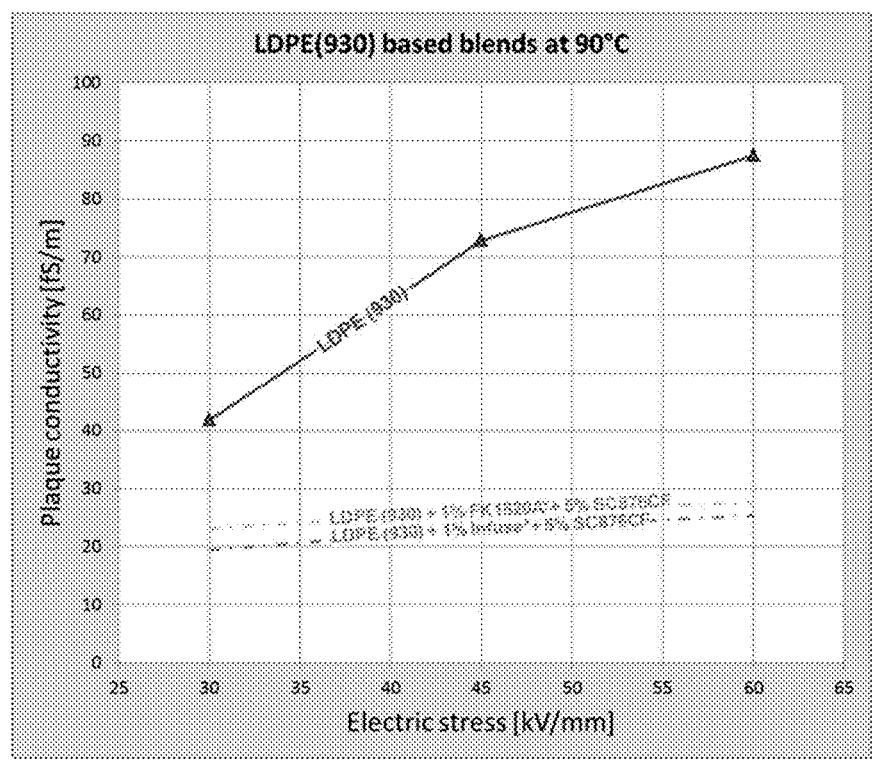

POLYMER BLEND COMPOSITION FOR WIRE AND CABLE APPLICATIONS WITH ADVANTAGEOUS ELECTRICAL PROPERTIES

FIELD OF INVENTION

The invention relates to a polymer composition which may be used for producing an insulation layer of cable, such as a direct current (DC) power cable. In particular, the invention relates to a polymer composition which is a blend of an LDPE, polypropylene (PP) and a compatibiliser, which has surprisingly low electrical conductivity. In one embodiment, the polymer composition of the invention is used in non-crosslinked form thus avoiding the need for a crosslinking agent to be present and avoiding the need for post crosslinking and degassing procedures to remove crosslinking agent by-products. In another embodiment, the polymer composition is optionally crosslinkable and can thus be subsequently crosslinked.

The invention also relates to a cable, e.g. a direct current (DC) power cable, comprising the polymer composition in at least the insulation layer, as well as to a preparation process of the cable.

BACKGROUND

Polyolefins produced in a high pressure (HP) process are widely used in demanding polymer applications wherein the polymers must meet high mechanical and/or electrical requirements. For instance in power cable applications, particularly in medium voltage (MV) and especially in high voltage (HV) and extra high voltage (EHV) cable applications the electrical properties of the polymer composition have significant importance.

The electrical properties of importance may differ in different cable applications, as is the case between alternating current (AC) and direct current (DC) cable applications.

Furthermore, the mechanical properties of the polymer composition, in particular when subjected to heat in cable applications, are also of significance. In HV DC cables, the insulation is heated by the leakage current. For a specific cable design the heating is proportional to the insulation conductivity×(electrical field)$^2$. Thus, if the voltage is increased, far more heat will be generated. It is important that the mechanical properties, such as creep, of the polymer do not significantly deteriorate in the presence of this heat.

A typical power cable comprises a conductor surrounded, at least, by an inner semiconductive layer, an insulation layer and an outer semiconductive layer, in that order. The cables are commonly produced by extruding the layers on a conductor.

The polymer material in one or more of said layers is often crosslinked to improve e.g. heat and deformation resistance, creep properties, mechanical strength, chemical resistance and abrasion resistance of the polymer in the layer(s) of the cable. During a crosslinking reaction, crosslinks (bridges) are primarily formed. Crosslinking can be effected using, for example, a free radical generating compound which is typically incorporated in to the layer material prior to the extrusion of the layer(s) on a conductor. After formation of the layered cable, the cable is then subjected to a crosslinking step to initiate the radical formation and thereby crosslinking reaction.

Peroxides are very commonly used as free radical generating compounds. The resulting decomposition products of peroxides may include volatile by-products which are often undesired, since they may have a negative influence on the electrical properties of the cable. Therefore the volatile decomposition products such as methane are conventionally reduced to a minimum or removed after crosslinking and cooling step. Such a removal step, generally known as a degassing step, is time and energy consuming causing extra costs.

Cross-linked high pressure LDPE has been used for extruded HVDC cables for about 15 years. The latest products developed are approved for 640 kV cables. The industry however is demanding even higher voltages. With such higher voltages comes the challenge of developing materials which can withstand the heat generated within the cables and which show good temperature resistance in terms of their mechanical properties. In order to reach even higher voltage levels, insulation materials with even lower electrical conductivity will also be needed to prevent thermal runaway.

The DC electrical conductivity is thus an important material property for insulating materials, in particular those designed for use in high voltage direct current (HVDC) cables. First of all, the strong temperature and electric field dependence of this property will influence the electric field. The second issue is the fact that heat will be generated inside the insulation by the electric leakage current flowing between the inner and outer semiconductive layers. This leakage current depends on the electric field and the electrical conductivity of the insulation. High conductivity of the insulating material can even lead to thermal runaway under high stress/high temperature conditions. The conductivity must therefore be sufficiently low to avoid thermal runaway.

Accordingly, in HVDC cables, the insulation is heated by the leakage current. For a specific cable design the heating is proportional to the insulation conductivity×(electrical field)$^2$. Thus, if the voltage is increased for a given cable design, far more heat will be generated.

There are high demands to increase the voltage of a power cable, particularly of a direct current (DC) power cable, and thus a continuous need to find alternative polymer compositions which have the necessary mechanical properties required for demanding power cable applications and, importantly, required reduced conductivity.

Our invention seeks to lower the conductivity of the insulation layer materials that can be formed from LDPE, and, at the same time, to optimise the thermomechanical resistance of the polymer composition, optionally whilst avoiding the problems associated with crosslinking and subsequent degassing. LDPE is inherently a very clean material since it does not contain any catalyst residues. Such impurities can be seen as defects that may cause electric breakdown and/or higher electric conductivity. As voltages increase, the problem of impurities is exacerbated and hence LDPE is therefore the ideal base material for insulation layers for cables and is favoured over polymers made in low pressures processes such as LLDPE. A problem with LDPE is, however, the relatively low melting point that leads to low thermomechanical performance, which is probably not adequate for HVDC cables. Thus, to find improved LDPE based materials would be of great value.

Previous studies have demonstrated that blending LDPE with different polymers can lead to attractive conductivity properties.

For example, WO 2011/113686, WO 2012/150285 and WO 2016/066619 all relate to polymer compositions, comprising blends, with improved DC electrical properties.

The inventors have now found that polymer compositions comprising a blend of an LDPE with polypropylene (PP)

and a compatibiliser, offers remarkably low conductivity, as well as, improved thermomechanical performance. In particular, we demonstrate that the blends of the invention can be used in cable layers. The polymer compositions can be used to prepare, for example, the insulation layer in a direct current (DC) power cable, offering cables which can operate at voltages higher than possible today.

SUMMARY OF INVENTION

Thus viewed from one aspect the invention provides a polymer composition comprising:
a) a low density polyethylene (LDPE);
b) polypropylene (PP) and;
c) a compatibiliser.

In particular, the polymer composition of the invention comprises an LDPE, PP and a compatibiliser, wherein the compatibiliser is an ethylene copolymer or olefin block copolymer.

Viewed from another aspect, the invention provides a polymer composition comprising
a) a low density polyethylene (LDPE); and
b) polypropylene (PP) and;
c) a compatibiliser;
wherein the polymer composition has lower DC conductivity when measured according to DC conductivity method as described under "Determination Methods" than an otherwise identical polymer composition not comprising said polypropylene (PP) and said compatibiliser.

Viewed from another aspect, the invention provides an insulation layer, e.g. of a cable, comprising a polymer composition as hereinbefore defined.

Viewed from another aspect, the invention provides a cable comprising one or more conductors surrounded by at least an insulation layer, wherein said insulation layer comprises a polymer composition as hereinbefore defined.

In particular the cable of the invention is a direct current (DC) power cable, preferably operating at or capable of operating at 320 kV or more, such as 640 kV or more.

Viewed from another aspect the invention provides a process for producing a cable comprising the steps of:
applying on a conductor, preferably by (co)extrusion, at least an insulation layer wherein the insulation layer comprises a polymer composition as hereinbefore defined.

In one embodiment the insulation layer may be crosslinked. It is preferred however, if the polymer composition of the invention and hence the insulation layer of a cable of the invention is not crosslinked. The polymer composition of the invention and hence the insulation layer of a cable of the invention is preferably thermoplastic. The polymer composition of the invention and hence the insulation layer of a cable of the invention is preferably free of any initiator such as a peroxide.

Viewed from another aspect the invention provides the use of a polymer composition as hereinbefore defined in the manufacture of an insulation layer in a cable.

BRIEF DESCRIPTION OF THE DRAWINGS

The FIGURE shows the conductivity results for inventive compositions (IE 1) and (IE 2) and comparative composition (CE 1).

DETAILED DESCRIPTION OF INVENTION

The present invention requires the combination of an LDPE polymer, polypropylene (PP) and a compatibiliser in a polymer composition. The polymer composition unexpectedly has advantageous electrical properties and advantageous thermomechanical properties.

The polymer composition has reduced, i.e. low, electrical conductivity. "Reduced" or "low" electrical conductivity as used herein interchangeably means that the value obtained from the DC conductivity measurement as defined below under "Determination methods" is low, i.e. reduced. The low electrical conductivity is beneficial for minimising undesired heat formation, e.g. in an insulation layer of a power cable.

Further, the polymer composition also has improved thermomechanical resistance compared to LDPE alone. Unexpectedly, the combination of a low density polyethylene (LDPE), polypropylene (PP) and a compatibiliser has advantageous thermomechanical properties, e.g. in terms of a relatively higher effective melting point.

Moreover, in embodiments of the invention the polymer composition has said electrical properties and is not crosslinked. Non cross-linked polymer compositions or cable layers are regarded as thermoplastic.

In still further embodiments the polymer composition is crosslinked.

Low Density Polyethylene (LDPE)

The low density polyethylene, LDPE, is a polyethylene produced in a high pressure process. Typically the polymerization of ethylene and optional further comonomer(s) in the high pressure process is carried out in the presence of an initiator(s). The meaning of LDPE polymer is well known and documented in the literature.

Although the term LDPE is an abbreviation for low density polyethylene, the term is understood not to limit the density range, but covers the LDPE-like high pressure (HP) polyethylenes with low, medium and higher densities. The term LDPE describes and distinguishes a high pressure polyethylene from low pressure polyethylenes produced in the presence of an olefin polymerisation catalyst. LDPEs have certain typical features, such as different branching architecture and are inherently free from catalyst residues.

A "non-crosslinked" low density polyethylene (LDPE) means that the LDPE, which might be present in a layer of a final DC cable (in use), is not crosslinked and is thus thermoplastic.

In further embodiments the LDPE may be selected from an optionally unsaturated LDPE homopolymer and an optionally unsaturated LDPE copolymer of ethylene with one or more comonomer(s).

The LDPE may be a low density homopolymer of ethylene (referred herein as LDPE homopolymer) or a low density copolymer of ethylene with one or more comonomer(s) (referred herein as LDPE copolymer). The one or more comonomers of the LDPE copolymer may be selected from the group consisting of polar comonomer(s), non-polar comonomer(s) or from a mixture of the polar comonomer(s) and non-polar comonomer(s). Moreover, said LDPE homopolymer or LDPE copolymer may optionally be unsaturated.

In embodiments wherein the LDPE is non-crosslinked, the LDPE may be an LDPE homopolymer. Alternatively, in embodiments wherein the LDPE is crosslinked, the LDPE may be an LDPE copolymer, in particular an LDPE copolymer of ethylene with one or more comonomers, e.g. one or more polyunsaturated comonomer, selected from one or more, of a diene, for example, a diene which comprises at least 8 carbon atoms, the first carbon-carbon double bond being terminal and the second carbon-carbon double bond being non-conjugated to the first one. Further, exemplified dienes may be selected from $C_8$ to $C_{14}$ non-conjugated dienes or mixtures thereof, for example, selected from 1,7-octadiene, 1,9-decadiene, 1,11-dodecadiene, 1,13-tetradecadiene, 7-methyl-1,6-octadiene, 9-methyl-1,8-decadiene, or mixtures thereof. In a further embodiment, the diene is selected from 1,7-octadiene, 1,9-decadiene, 1,11-dodecadiene, 1,13-tetradecadiene, or any mixture thereof.

In one embodiment, the LDPE is an LDPE homopolymer.

As a polar comonomer for the LDPE copolymer, comonomer(s) containing hydroxyl group(s), alkoxy group(s), carbonyl group(s), carboxyl group(s), ether group(s) or ester group(s), or a mixture thereof, can be used. For example, comonomer(s) containing carboxyl and/or ester group(s) may are used as said polar comonomer. Further examples of the polar comonomer(s) of the LDPE copolymer include acrylate(s), methacrylate(s) or acetate(s), or any mixtures thereof.

If present in said LDPE copolymer, the polar comonomer(s) may be selected from the group of alkyl acrylates, alkyl methacrylates or vinyl acetate, or a mixture thereof. For example, said polar comonomers can be selected from $C_1$- to $C_6$-alkyl acrylates, $C_1$- to $C_6$-alkyl methacrylates or vinyl acetate. In one embodiment, said LDPE copolymer is a copolymer of ethylene with $C_1$- to $C_4$-alkyl acrylate, such as methyl, ethyl, propyl or butyl acrylate, or vinyl acetate, or any mixture thereof.

As the non-polar comonomer(s) for the LDPE copolymer, comonomer(s) other than the above defined polar comonomers can be used. For example, the non-polar comonomers are other than comonomer(s) containing hydroxyl group(s), alkoxy group(s), carbonyl group(s), carboxyl group(s), ether group(s) or ester group(s). One group of non-polar comonomer(s) includes those comprising (e.g. consisting of) monounsaturated (=one double bond) comonomer(s), preferably olefins, preferably alpha-olefins, more preferably $C_3$ to $C_{10}$ alpha-olefins, such as propylene, 1-butene, 1-hexene, 4-methyl-1-pentene, styrene, 1-octene, 1-nonene; polyunsaturated (=more than one double bond) comonomer(s); a silane group containing comonomer(s); or any mixtures thereof. The polyunsaturated comonomer(s) are further described below in relation to unsaturated LDPE copolymers.

If the LDPE polymer is a copolymer, it may comprise 0.001 to 35 wt %, such as less than 30 wt %, for example less than 25 wt %, of one or more comonomer(s) relative to the total weight of the copolymer as a whole. Example ranges include 0.5 to 10 wt %, such as 0.5 to 5 wt % comonomer.

The LDPE polymer, may optionally be unsaturated, i.e. may comprise carbon-carbon double bonds (—C=C—). Example "unsaturated" LDPEs contain carbon-carbon double bonds/1000 carbon atoms in a total amount of at least 0.4/1000 carbon atoms. If a non-crosslinked LDPE is used in the final cable, then the LDPE is typically not unsaturated as defined above.

As well known, the unsaturation can be provided to the LDPE polymer by means of the comonomers, a low molecular weight (Mw) additive compound, such as a crosslinking booster, chain transfer agent (CTA) or scorch retarder additive, or any combinations thereof. The total amount of double bonds means herein double bonds added by any means. If two or more above sources of double bonds are chosen to be used for providing the unsaturation, then the total amount of double bonds in the LDPE polymer means the sum of the double bonds present. Any double bond measurements are carried out prior to optional crosslinking.

The term "total amount of carbon-carbon double bonds" refers to the combined amount of double bonds which originate from vinyl groups, vinylidene groups and trans-vinylene groups, if present.

If an LDPE homopolymer is unsaturated, then the unsaturation can be provided e.g. by a chain transfer agent (CTA), such as propylene, and/or by polymerization conditions. If an LDPE copolymer is unsaturated, then the unsaturation can be provided by one or more of the following means: by a chain transfer agent (CTA), by one or more polyunsaturated comonomer(s) or by polymerisation conditions. It is well known that selected polymerisation conditions such as peak temperatures and pressure, can have an influence on the unsaturation level. In case of an unsaturated LDPE copolymer, it may be for example an unsaturated LDPE copolymer of ethylene with at least one polyunsaturated comonomer, and optionally with other comonomer(s), such as polar comonomer(s), e.g. an acrylate or acetate comonomer(s). In one embodiment, an unsaturated LDPE copolymer is an unsaturated LDPE copolymer of ethylene with at least polyunsaturated comonomer(s).

An embodiment discloses a polymer composition as described herein, wherein the LDPE is selected from an optionally unsaturated LDPE homopolymer and an optionally unsaturated LDPE copolymer of ethylene with one or more comonomer(s).

The polyunsaturated comonomers may consist of a straight carbon chain with at least 8 carbon atoms and at least 4 carbons between the non-conjugated double bonds, of which at least one is terminal. For example, the polyunsaturated comonomer can be a diene, such as a diene which comprises at least eight carbon atoms, the first carbon-carbon double bond being terminal and the second carbon-carbon double bond being non-conjugated to the first one. Example dienes are selected from $C_8$ to $C_{14}$ non-conjugated dienes or mixtures thereof, more preferably selected from 1,7-octadiene, 1,9-decadiene, 1,11-dodecadiene, 1,13-tetradecadiene, 7-methyl-1,6-octadiene, 9-methyl-1,8-decadiene, or mixtures thereof. In some embodiments, the diene is selected from 1,7-octadiene, 1,9-decadiene, 1,11-dodecadiene, 1,13-tetradecadiene, or any mixture thereof, however, without limiting to above dienes.

It is well known that e.g. propylene can be used as a comonomer or as a chain transfer agent (CTA), or both, whereby it can contribute to the total amount of the carbon-carbon double bonds, e.g. to the total amount of the vinyl groups. Herein, when a compound which can also act as comonomer, such as propylene, is used as CTA for providing double bonds, then said copolymerisable comonomer is not calculated to the comonomer content.

If LDPE polymer is unsaturated, then it may have a total amount of carbon-carbon double bonds, which originate from vinyl groups, vinylidene groups and trans-vinylene groups, if present, of more than 0.4/1000 carbon atoms, such as of more than 0.5/1000 carbon atoms. The upper limit of the amount of carbon-carbon double bonds present in the polyolefin is not limited and may for example be less than 5.0/1000 carbon atoms, such as less than 3.0/1000 carbon atoms.

In some embodiments, e.g. wherein higher crosslinking level with the low peroxide content is desired, the total amount of carbon-carbon double bonds, which originate from vinyl groups, vinylidene groups and trans-vinylene groups, if present, in the unsaturated LDPE, may be higher than 0.40/1000 carbon atoms, such as higher than 0.50/1000 carbon atoms, for example higher than 0.60/1000 carbon atoms.

If the LDPE is unsaturated LDPE as defined above, it may contain at least vinyl groups and the total amount of vinyl groups can be higher than 0.05/1000 carbon atoms, such as higher than 0.08/1000 carbon atoms, for example higher than 0.11/1000 carbon atoms. In one embodiment, the total amount of vinyl groups is of lower than 4.0/1000 carbon atoms. The LDPE a) prior to crosslinking, may contain vinyl groups in total amount of more than 0.20/1000 carbon atoms, such as more than 0.30/1000 carbon atoms.

In an alternative embodiment the LDPE of the invention is not unsaturated and possesses less than 0.2 C=C/1000 C atoms.

The LDPE polymer of the invention typically has a high melting point, which may be of importance especially for a thermoplastic insulation material. Melting points of 112° C. or more are envisaged, such as 114° C. or more, especially 116° C. or more, such as 112 to 130° C.

Typically, in wire and cable (W&C) applications, the density of LDPE a) is higher than 860 kg/m³. The density of the LDPE homopolymer or copolymer is usually not higher than 960 kg/m³, and may be in the range from 900 to 945 kg/m³.

The $MFR_2$ (2.16 kg, 190° C.) of the LDPE polymer, can be from 0.01 to 50 g/10 min, such as from 0.05 to 30.0 g/10 min, for example from 0.1 to 20 g/10 min, especially from 0.2 to 10 g/10 min.

The LDPE polymer is produced at high pressure by free radical initiated polymerisation (referred to as high pressure (HP) radical polymerization). The HP reactor can be e.g. a well-known tubular or autoclave reactor or a mixture thereof, especially a tubular reactor. The high pressure (HP) polymerisation and the adjustment of process conditions for further tailoring the other properties of the polyolefin depending on the desired end application are well known and described in the literature, and can readily be used by a skilled person. Suitable polymerisation temperatures range up to 400° C., such as from 80 to 350° C. and pressure from 70 MPa, for example 100 to 400 MPa, especially from 100 to 350 MPa. Pressure can be measured at least after compression stage and/or after the tubular reactor. Temperature can be measured at several points during all steps.

After the separation the obtained LDPE is typically in a form of a polymer melt which is normally mixed and pelletized in a pelletising section, such as pelletising extruder, arranged in connection to the HP reactor system. Optionally, additive(s), such as antioxidant(s), can be added in this mixer in a known manner.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

When an unsaturated LDPE copolymer of ethylene is prepared, then, as well known, the carbon-carbon double bond content can be adjusted by polymerising the ethylene e.g. in the presence of one or more polyunsaturated comonomer(s), chain transfer agent(s), or both, using the desired feed ratio between monomer, e.g. ethylene, and polyunsaturated comonomer and/or chain transfer agent, depending on the nature and amount of C=C double bonds desired for the unsaturated LDPE copolymer. I.a. WO 9308222 describes a high pressure radical polymerisation of ethylene with polyunsaturated monomers. As a result the unsaturation can be uniformly distributed along the polymer chain in random copolymerisation manner.

The LDPE of the invention is not new. For example, Borealis grade LE6609-PH is suitable for use in the present invention.

It is preferred if the LDPE is an LDPE homopolymer or an LDPE copolymer with at least one non-polar comonomer such as a polyunsaturated comonomer as hereinbefore defined.

The Polypropylene (PP)

The polypropylene (PP) may be selected from a homopolymer of propylene or a copolymer of propylene with one or more comonomer(s), preferably with ethylene or higher alpha-olefins, or any mixtures thereof. The copolymer of propylene with one or more comonomer(s), preferably with one or more of ethylene or higher alpha-olefin comonomer(s), can be a random copolymer of propylene or a heterophasic copolymer of propylene, which have a well known meaning.

The heterophasic copolymer of propylene suitable as the propylene polymer (PP) can have a propylene homopolymer or a propylene random copolymer matrix component (PP1), wherein another propylene copolymer component (PP2) is dispersed. The propylene copolymer component (PP2) has typically a lower structural order (also known as block copolymer of propylene or a rubber part) than the matrix polymer.

In the random copolymer of propylene the comonomer(s) are distributed randomly to the backbone of the propylene polymer chain. According to a preferred embodiment of the polymer composition of the present invention, the propylene polymer (PP) is a heterophasic polymer composition comprising a propylene homopolymer matrix (PP1) or random copolymer matrix (PP1) and dispersed therein a propylene copolymer component (PP2) with one or more ethylene or higher alpha-olefin comonomer(s). Accordingly, there are essentially two kinds of heterophasic propylene copolymers known in the art, namely heterophasic copolymers comprising a propylene random copolymer as matrix phase (RA-HECO) or heterophasic copolymers having a propylene homopolymer as matrix phase (HECO).

Again, also in case of heterophasic copolymers of propylene, a random copolymer matrix (PP1) is a copolymer where the comonomer part is randomly distributed in the polymer chains, i.e. consists of alternating sequences of two monomeric units of random length (including single molecules). Preferably, the propylene copolymer (PP2) dispersed in the propylene homopolymer or copolymer matrix (PP1) of the heterophasic propylene copolymer as the propylene polymer (PP2) is substantially amorphous. The term "substantially amorphous" means herein that the propylene copolymer (PP2) is less crystalline than the homopolymer or copolymer matrix (PP1), preferably that the propylene copolymer has a residual crystallinity below a level corresponding to a melting enthalpy of 10 J/g measured according to DSC-ISO 3146.

More preferably, the propylene copolymer (PP2) dispersed in the propylene homopolymer or copolymer matrix (PP1) of the heterophasic propylene copolymer as the polypropylene (PP) has a weight average particle size of at least less than 1 μm; preferably of 0.9 μm or less, more preferably of 0.8 μm or less. This preferable weight average particle size of less than 1 μm allows a good particle distribution of the dispersed propylene copolymer component to the matrix component and contributes to the impact strength of the polymer composition.

Moreover, a low weight average particle size decreases the risk of crazes being initiated by these particles while improving the possibility of said particles to stop already formed crazes or cracks. The weight average particle size distribution of said dispersed propylene copolymer in said polypropylene matrix can be determined by suitable microscopic methods. Examples for such methods are atomic force microscopy (AFM), scanning electron microscopy (SEM) and transmission electron microscopy (TEM). Etching and/or staining of the specimens is normally required to achieve the necessary resolution and clarity of images.

Examples for the determination of the particle size distribution and the calculation of the weight average particle size there from can be found in the literature. A suitable method involving SEM on specimens stained with $RuO_4$ is described in Pölt et al. J. Appl. Polym. Sci. 78 (2000) 1152-61. Preferably said polypropylene matrix (PP1) of the heterophasic polypropylene as the polypropylene (PP) has a melting enthalpy of 25 to 70 J/g at a temperature range of 130° C. to 170° C. measured according to DSC-ISO 3146.

The preferred heterophasic polypropylene as the preferred polypropylene (PP) is a random heterophasic propylene copolymer (RAHECO). It is preferred that the random propylene copolymer or the matrix of the random heterophasic polypropylene as defined above comprises at least one comonomer selected from the group consisting of ethylene and $C_4$-$C_8$ alpha-olefins. Preferred $C_4$-$C_8$ alpha-olefins are 1-butene, 1-pentene, 4-methyl-1-pentene, 1-hexene, 1-heptene or 1-octene, more preferred 1-butene. The most preferred random propylene copolymer consists of propylene and ethylene.

Furthermore, the comonomer content of the polypropylene matrix preferably is 0.5 to 30 wt %, more preferably 1 to 20 wt % and most preferably 2 to 7 wt %. Preferably the polypropylene polymer (PP) as the polypropylene (PP) of the polymer composition has an MFR (230° C., 2.16 kg) from 0.05 to 20.0 g/10 min, preferably from 0.05 to 10.0 g/10 min, preferably from 0.1 to 10.0 g/10 min, depends on the desired end application. In some applications MFR (230° C., 2.16 kg) of even from 0.2 to 2.0 g/10 min is desired.

The polypropylene as the preferred polypropylene (PP) preferably has a melting temperature, Tm, of at least 100° C., preferably from 110 to 180° C., preferably from 120 to 170° C., more preferably from 130 to 160° C., more preferably from 135 to 150° C.

The preferred polymer composition comprising polypropylene as the polypropylene (PP) with high Tm has an advantage of having desirable impact strength and flexibility properties both at low and high temperatures and, additionally, an advantage of withstanding higher operating temperatures e.g. up to 110° C., when using a base polymer with high Tm. Examples of suitable polypropylenes are described in e.g. WO03/0026522.

The Compatibiliser

The compatibiliser may be an ethylene copolymer or olefin block copolymer. This must be different from either component (a) or (b).

Ethylene Copolymer

If the compatibiliser is an ethylene copolymer, it may be either a unimodal or a multimodal ethylene copolymer.

In an embodiment of the present invention, the ethylene copolymer is a multimodal ethylene copolymer.

By multimodal ethylene copolymer is meant a copolymer which contains distinct components having different average molecular weights, different contents of comonomer or both. The modality of the ethylene copolymer can be determined according to known methods. Preferably, the copolymer contains distinct components having different average molecular weights. The multimodal copolymer is produced by copolymerizing ethylene and at least two comonomers in two or more polymerization stages where the polymerization conditions are sufficiently different to allow production of different polymers in different stages.

The "first copolymer" is defined as the polymer produced in the first polymerization step (preferably a loop reactor or loop reactors). This first copolymer may comprise two or more fractions. The fractions are further denominated as "first fraction of the first copolymer", "second fraction of the first copolymer", etc. A "first copolymer mixture" is defined as sum of all polymer fractions produced in the first polymerization step, i.e. prepolymerization, any first or second fraction of the first copolymer.

Similar a "second copolymer" is defined as the polymer produced in the second polymerization step, differing from the first polymerization step, preferably done in a gas-phase-reactor.

Similar, a "second copolymer mixture" is defined as sum of all polymer fractions produced in the second polymerization step, i.e. any first or second fraction of the first copolymer and the second copolymer. The multimodal ethylene copolymer is a copolymer of ethylene and at least two alpha-olefin comonomers, whereby the multimodal ethylene copolymer comprises a first copolymer of ethylene and an alpha-olefin comonomer having from 4 to 10 carbon atoms and a second copolymer of ethylene and an alpha-olefin comonomer having from 6 to 10 carbon atoms. There must be at least two different comonomers present, i.e. both components cannot be ethylene hex-1-ene copolymers. It is preferred if the comonomers present in the first and second copolymers are different. Ideally any comonomer used in the first copolymer is not used in the manufacture of the second copolymer.

Preferably the multimodal ethylene copolymer is a copolymer of ethylene and at least two comonomers selected from 1-butene, 1-hexene, and 1-octene. It is further preferred that the multimodal ethylene copolymer is a copolymer of ethylene and exactly two comonomers selected from 1-butene, 1-hexene, or 1-octene. Especially preferred is a multimodal ethylene copolymer comprising a first copolymer comprising ethylene and 1-butene, and a second copolymer comprising ethylene and 1-hexene.

Even more preferred is a multimodal ethylene copolymer comprising a first copolymer consisting of ethylene and 1-butene and a second copolymer of ethylene consisting of ethylene and 1-hexene.

The ethylene copolymer, preferably multimodal ethylene copolymer, preferably has a final density p of from 906 to 925 $kg/m^3$, preferably 910 to 925 $kg/m^3$ and more preferably from 913 to 923 $kg/m^3$. The resins having densities lower than 906 $kg/m^3$ tend to be so sticky that their production becomes problematic in a particle forming process. On the other hand, the resins having a final density of more than 925 $kg/m^3$ do not have the required balance of properties required in the end use applications for the multimodal ethylene copolymer, such as they are not sufficiently soft and they may have a too low tear strength.

The ethylene copolymer, preferably multimodal ethylene copolymer, preferably has a melt flow rate $MFR_{21}$ of 10-200 g/10 min, preferably from 20-150 g/10 min, such as 25-100 g/min, such as 28-80 g/10 min. The resins having an $MFR_{21}$ of less than 10 g/10 min tend to have too high melt viscosity so that the throughput in a converting process may become restricted. On the other hand, the resins having $MFR_{21}$ of more than 200 g/10 min have too low melt strength for the end use applications. In addition, the combination of a high melt index with a low density of the resin often causes the resin particles to be sticky and this causes problems in a particle forming process, such as plugging and fouling of process equipment.

In addition, the multimodal ethylene copolymer can have a flow rate ratio $FRR_{21/5}$ of at least 15 or more, such as 20 or 23 or more. Furthermore, it can have a flow rate ratio $FRR_{21/5}$ in the range of 15-40, preferably in the range of 20-35. The multimodal ethylene copolymer preferably has a melt flow rate $MFR_5$ of 0.1-20 g/10 min, preferably from 0.5-10 g/10 min, such as 0.5-8.0 g/min, especially 0.5-5.0 g/10 min. The $MFR_5$ is preferably from 0.8 to 4.0 g/10 min.

In an embodiment of the present invention, the ethylene copolymer is a bimodal ethylene copolymer.

In still an embodiment of the present invention, the ethylene copolymer is a unimodal ethylene copolymer.

A multimodal, such as bimodal, ethylene copolymer can, e.g., be obtained in a multi-stage process using two or more reactors coupled in series when a metallocene catalyst is used and slightly different reaction conditions in each reaction stage are applied.

Further, a unimodal ethylene copolymer can, e.g., be suitably be obtained in process using one reactor.

In a preferred embodiment the ethylene copolymer is a linear low density polyethylene (LLDPE). Preferred LLDPEs have a density of 906 to 925 kg/m$^3$, preferably 910 to 925 kg/m$^3$ and more preferably from 913 to 923 kg/m$^3$. The LLDPE of the invention is preferably a copolymer of ethylene and one or more C4-10 alpha olefins. Most especially, the compatibiliser is a multimodal LLDPE.

Olefin Block Copolymer

In some embodiments the compatibiliser is an olefin block copolymer derived from ethylene and at least one of a $C_3$ to $C_{10}$ alpha-olefin or is derived from propylene and at least one of a $C_2$ and $C_4$ to $C_{10}$ alpha-olefin. For example, the compatibiliser may be an ethylene-propylene copolymer, an ethylene-butylene copolymer, an ethylene-hexene copolymer, and/or an ethylene-octene copolymer. The compatibiliser may be a random or an olefin block copolymer different from the block copolymer of the block composite discussed above.

The olefin block copolymer may be made via a process described in U.S. Pat. Nos. 7,608,668, 7,858,706, and/or 7,858,707.

The olefin block copolymer may have a melt index such that the melt index is from 10 g/10 min to 1500 g/10 min, according to ASTM D1238 and at 190° C./2.16 kg. For example, the melt index may be from 10 g/10 min to 1000 g/10 min, 10 g/10 min to 500 g/10 min, 10 g/10 min to 300 g/10 min, 10 g/10 min to 100 g/10 min, 10 g/10 min to 50 g/10 min, and/or 10 g/10 min to 40 g/10 min.

The olefin block copolymer preferably has a relatively low density such that the density is from 0.854 g/cm$^3$ to 0.900 g/cm$^3$, according to ASTM D792. For example, the density may be from 0.860 g/cm$^3$ to 0.890 g/cm$^3$, 0.860 g/cm$^3$ to 0.885 g/cm$^3$, 0.865 g/cm$^3$ to 0.880 g/cm$^3$, 0.870 g/cm$^3$ to 0.879 g/cm$^3$, and/or 0.872 g/cm$^3$ to 0.876 g/cm$^3$.

The olefin block copolymer may have a low glass transition temperature, e.g., less than −30° C., less than −40° C., and/or less than −50° C. The glass transition temperature (Tg) may be greater than −80° C. The Brookfield viscosity (@ 350° F./177° C.) may be from 1,000 cP to 25,000 cP (e.g., from 3000 cP to 20000 cP, from 5000 cP to 20000 cP, from 10000 cP to 20000 cP, and/or from 15000 cP to 20000 cP).

The olefin block copolymer may have a low weight average molecular weight (Mw), e.g., less than or equal to 70000 g/mole, less than or equal to 50000 g/mole, and/or less than or equal to 40000 g/mole. The weight average molecular weight (Mw) may be greater than or equal to 10000 g/mole, greater than or equal to 20000 g/mole, and/or greater than or equal to 30000 g/mole.

Exemplary block copolymers that may be used in the compatibiliser are available from The Dow Chemical Company under the tradenames ENGAGE™ and INFUSE™.

Polymer Composition

The polymer composition of the invention comprises
a) a low density polyethylene (LDPE); and
b) polypropylene (PP) and;
c) a compatibiliser.

Whilst it is within the ambit of the invention for the polymer composition to contain further polymer components in addition to LDPE a) polypropylene (PP) b) and said compatibiliser c), in one embodiment the polymer composition of the invention can consist of LDPE a) polypropylene (PP) b) and said compatibiliser c) as the sole polymer components. It will be appreciated that a polymer composition consisting of components a), b) and c) as the sole polymer components does not exclude the possibility for the composition to further comprise standard polymer additives such as scorch retarders, water tree retarders, antioxidants and so on.

In a further embodiment the polymer composition of the invention can comprise LDPE a) polypropylene (PP) b) and said compatibiliser c) and any suitable further polymer components.

In an embodiment of the present invention, a polymer composition is disclosed wherein the LDPE is selected from an optionally unsaturated LDPE homopolymer and an optionally unsaturated LDPE copolymer of ethylene with one or more comonomer(s); and/or wherein the PP is selected from a homopolymer of propylene or a copolymer of propylene with one or more comonomer(s), preferably with ethylene or higher alpha-olefins, or any mixtures thereof; and/or wherein the PP is a random copolymer of propylene or a heterophasic copolymer of propylene.

In still an embodiment of the present invention, a polymer composition is disclosed wherein the LDPE is selected from an optionally unsaturated LDPE homopolymer and an optionally unsaturated LDPE copolymer of ethylene with one or more comonomer(s); and/or wherein the PP is selected from a homopolymer of propylene or a copolymer of propylene with one or more comonomer(s), preferably with ethylene or higher alpha-olefins, or any mixtures thereof; and/or wherein the PP is a random copolymer of propylene or a heterophasic copolymer of propylene; and/or wherein the compatibiliser is ethylene copolymer, e.g. a unimodal or a multimodal ethylene copolymer, or olefin block copolymer.

In preferred an embodiment of the present invention, a polymer composition is disclosed wherein the LDPE is an LDPE homopolymer, the PP is a copolymer of propylene with one or more comonomer(s), preferably a heterophasic copolymer of propylene or random heterophasic copolymer of propylene; and/or wherein the compatibiliser is a linear low density ethylene copolymer, e.g. a unimodal or a multimodal LLDPE, or olefin block copolymer.

The polymer composition of the invention preferably comprises the LDPE a) in an amount of at least 55 wt %, such as at least 60 wt %, especially at least 70 wt %.

The polymer composition of the invention preferably comprises PP b) in an amount of 0.01 to 40 wt %, for example 1.0 to 40 wt %, such as 1.0 to 30 wt %, especially 2.0 to 25 wt %.

The polymer composition preferably comprises the compatibiliser c) in an amount of 0.01 to 10 wt %, such as 0.01 to 5 wt %.

In a further embodiment the polymer composition of the invention comprises the LDPE a) in an amount of 80 to 99.99 wt %, e.g., 90 to 99.99 wt %, e.g. 91 to 97 wt %, such as 95 to 99.98 wt %, relative to the total weight of the polymer composition as a whole, and/or the PP b) in an amount of 0.01 to 20 wt %, such as 0.02 to 5 wt %, relative to the total weight of the polymer composition as a whole, and/or the compatibiliser c) in an amount of 0.01 to 5 wt %, e.g., 0.005 to 5 wt %, for example, 0.001 to 2 wt %, e.g. 0.005 to 1.5 wt %, e.g. 0.02 to 1.3 wt %, relative to the total weight of the polymer composition as a whole.

The LDPE a) may be present in an amount of 80 to 99.99 wt %, e.g. 90 to 99.99 wt %, such as 95 to 99.98 wt %, for example 97.5 to 99.95 wt %, especially 98.5 to 99.90 wt %, relative to the total weight of the polymer composition as a whole.

In a more preferred embodiment, the LDPE a) may be present in an amount of at least 79 wt %, e.g. at least 89 wt %, such as 79 to 95 wt %, relative to the total weight of the polymer composition as a whole.

The polypropylene (PP) b) may be present in an amount of 0.01 to 20 wt %, e.g. 0.01 to 10 wt %, such as 0.02 to 5 wt %, for example 0.05 to 3.5 wt %, e.g. 0.1 to 2.0 wt %, relative to the total weight of the polymer composition as a whole.

More preferably, the polypropylene (PP) b) may be present in an amount of 1.0 to 20 wt %, e.g. 2.0 to 10 wt %, such as 3.0 to 10 wt % relative to the total weight of the polymer composition as a whole.

Further, the polypropylene (PP) b) may be present in an amount of 0.01 to 20 wt %, such as 0.02 to 5 wt %.

The polypropylene (PP) b) may be present in an amount of 0.05 to 3.5 wt %, e.g. 0.1 to 2.0 wt %, relative to the total weight of the polymer composition as a whole.

The compatibiliser c) may be present in an amount of 0.01 to 5 wt %, or 0.005 to 5 wt %, for example, 0.01 to 2 wt %, or. 0.005 to 1.5 wt %, e.g. 0.02 to 1.3 wt %, relative to the total weight of the polymer composition as a whole.

Alternatively, the compatibiliser c) may be present in an amount of 0.25 to 10 wt %, e.g., 0.5 to 5.0 wt %, for example, 0.75 to 5.0 wt % relative to the total weight of the polymer composition as a whole.

Further, the compatibiliser c) may be present in an amount of 0.005 to 5 wt %, e.g., 0.01 to 2 wt % relative to the total weight of the polymer composition as a whole.

The compatibiliser c) may be present in an amount 0.005 to 1.5 wt %, e.g. 0.02 to 1.3 wt %, relative to the total weight of the polymer composition as a whole.

Ideally, the LDPE a) may be present in an amount of at least 55 wt %, such as at least 79 wt %, e.g. at least 89 wt %, the polypropylene (PP) b) may be present in an amount of 1.0 to 40 wt %, e.g. 2.0 to 20 wt %, such as 3.0 to 10 wt %; and the compatibiliser c) may be present in an amount of 0.25 to 10 wt %, e.g., 0.5 to 5.0 wt %, for example, 0.75 to 5.0 wt %;

relative to the total weight of the polymer composition as a whole.

Preferred embodiments of the invention include a non-crosslinked polymer composition comprising
a) at least 55 wt % of a low density polyethylene (LDPE) homopolymer or LDPE copolymer with a non polar comonomer;
b) 1.0 to 40 wt % polypropylene copolymer (PP) and;
c) 0.25 to 10 wt % LLDPE or olefin block copolymer; or
a non-crosslinked polymer composition comprising
a) at least 55 wt % of a low density polyethylene (LDPE) homopolymer;
b) 1.0 to 40 wt % polypropylene copolymer (PP) and;
c) 0.25 to 10 wt % LLDPE; or
a non-crosslinked polymer composition as claimed in claim 14 comprising
a) at least 55 wt % of a low density polyethylene (LDPE) homopolymer;
b) 1.0 to 40 wt % heterophasic polypropylene copolymer or random heterophasic polypropylene copolymer (PP) and;
c) 0.25 to 10 wt % LLDPE.

Preferred embodiments of the invention include a non-crosslinked polymer composition comprising
a) at least 55 wt % of a low density polyethylene (LDPE) homopolymer or LDPE copolymer with a non polar comonomer;
b) 1.0 to 30 wt % polypropylene copolymer (PP) and;
c) 0.25 to 5.0 wt % LLDPE or olefin block copolymer; or
a non-crosslinked polymer composition comprising
a) at least 55 wt % of a low density polyethylene (LDPE) homopolymer;
b) 1.0 to 20 wt % polypropylene copolymer (PP) and;
c) 0.25 to 5.0 wt % LLDPE; or
a non-crosslinked polymer composition as claimed in claim 14 comprising
a) at least 55 wt % of a low density polyethylene (LDPE) homopolymer;
b) 3 to 10 wt % heterophasic polypropylene copolymer or random heterophasic polypropylene copolymer (PP) and;
c) 0.75 to 5.0 wt % LLDPE.

The polymer composition of the invention preferably has an electrical conductivity of 40 fS/m or less, more preferably of 35 fS/m or less, more preferably of 30 fS/m or less, such as 0.1 fS/m to 30 fS/m more preferably of 0.5 fS/m to 25 fS/m, when measured at 30 kV/mm according to DC conductivity method as described under "Determination Methods".

Furthermore, the polymer composition of the invention preferably has an electrical conductivity of 70 fS/m or less, more preferably of 50 fS/m or less, more preferably of 40 fS/m or less, such as 0.1 fS/m to 40 fS/m more preferably of 0.5 fS/m to 30 fS/m, when measured at 45 kV/mm according to DC conductivity method as described under "Determination Methods".

Furthermore, the polymer composition of the invention preferably has an electrical conductivity of 80 fS/m or less, more preferably of 60 fS/m or less, more preferably of 40 fS/m or less, such as 0.1 fS/m to 40 fS/m more preferably of 0.5 fS/m to 30 fS/m, when measured at 60 kV/mm according to DC conductivity method as described under "Determination Methods".

The polymer composition, according to the present invention, has lower DC conductivity when measured according to DC conductivity method as described under "Determination Methods" than an otherwise identical polymer composition not comprising said polypropylene (PP) and said compatibiliser. The DC conductivity of the polymer composition, according to the present invention, is, for example at least 10% lower, e.g. at least 30% lower, or, for example, 50% lower, than the conductivity of an otherwise identical polymer composition comprising neither the PP nor the compatibiliser, when measured according to DC conductivity method as described under "Determination Methods" at an electrical stress which is 30 kV/mm or more, e.g. is 45 kV/mm or more, for example, up to 60 kV/mm.

In still an embodiment, said DC conductivity is at least 30% lower, for example, 50% lower.

The polymer composition, according to the present invention, has a relatively higher effective melting point when compared to the LDPE alone.

In embodiments of the invention, the polymer composition, according to the present invention, has an effective melting point which is at least 2° C. higher, such as 3° C. higher, than the effective melting point of an otherwise identical polymer composition comprising neither the PP nor the compatibiliser. Thus, in a preferred embodiment, the melting point (DMTA), which is defined as the temperature where the storage shear modulus, G' is 2 MPa, is at least 118° C., preferably at least 119° C. such as at least 120° C.

The polymer composition of the invention is typically prepared by mixing components a), b) and c). Mixing may take place by any known method in the art, such as melt-mixing.

End Uses and End Applications of the Polymer Composition of Invention

The polymer composition of the invention can be used for producing an insulation layer of a cable, such as a direct current (DC) power cable, as defined above, below or in the claims.

The invention thus further provides a cable comprising one or more conductors surrounded by at least an insulation layer, wherein said insulation layer comprises a polymer composition as hereinbefore defined. For example, the cable typically comprises at least an inner semiconductive later, an insulation layer and an outer semiconductive layer, in that order, wherein said insulation layer comprises a polymer composition as hereinbefore defined The cable of the invention is preferably a DC power cable. A DC power cable is defined to be a DC cable transferring energy operating at any voltage level, typically operating at voltages higher than 1 kV. The DC power cable can be a low voltage (LV), a medium voltage (MV), a high voltage (HV) or an extra high voltage (EHV) DC cable, which terms, as well known, indicate the level of operating voltage. The polymer may, for example, be used in the insulation layer for a DC power cable operating at voltages higher than 36 kV, such as a HV DC cable. For HV DC cables the operating voltage is defined herein as the electric voltage between ground and the conductor of the high voltage cable.

In one embodiment, the HV DC power cable of the invention is one operating at voltages of 40 kV or higher, even at voltages of 50 kV or higher. For example, the HVDC power cable operates at voltages of 60 kV or higher. The invention is also highly feasible in very demanding cable applications and further cables of the invention are HVDC power cable operating at voltages higher than 70 kV. Voltages of 100 kV or more are targeted, such as 200 kV or more, such as 300 kV or more, especially 400 kV or more, more especially 500 kV or more. Voltages of 640 KV or more, such as 700 kV are also envisaged. The upper limit is not limited. The practical upper limit can be up to 1500 kV, such as 1100 kV. The cables of the invention operate well therefore in demanding extra HVDC power cable applications operating 400 to 850 kV, such as 640 to 850 kV.

The cable of the invention, such as a DC cable, typically comprises an inner semiconductive layer comprising a first semiconductive composition, an insulation layer comprising the polymer composition of the invention and an outer semiconductive layer comprising a second semiconductive composition, in that order.

The polymer composition of the invention is used in the insulation layer of the cable. Ideally, the insulation layer comprises 95 wt % of the polymer composition of the invention or more such as 98 wt % of the polymer composition or more, e.g. 99 wt % of the polymer composition or more. In one embodiment the polymer composition of the invention is the only polymer component used in the insulation layer of the cables of the invention, e.g. the insulation layer consists essentially of the polymer composition of the invention. The term consists essentially of is used herein to mean that the only polymer component present in the insulation layer is the polymer composition. It will be appreciated that the insulation layer may contain standard polymer additives such as scorch retarders, water tree retarders, antioxidants and so on. These are not excluded by the term consists essentially of. Note also that these additives may be added as part of a masterbatch and hence carried on a polymer carrier. The use of masterbatch additives is not excluded by the term consists essentially of.

The insulation layer can have a beneficial low electrical conductivity when it is crosslinked with a crosslinking agent. The insulation layer of the cables of the invention can thus optionally be crosslinkable. In one embodiment the insulation layer is not crosslinked.

The term crosslinkable means that the insulation layer can be crosslinked using a crosslinking agent before use. The insulation layer will need to comprise a crosslinking agent in order to be crosslinkable, typically a free radical generating agent. The crosslinked polymer composition has a typical network, i.a. interpolymer crosslinks (bridges), as well known in the field.

If the insulation layer is crosslinked, any parameter of the insulation layer is ideally measured on the crosslinked cable unless otherwise indicated. Crosslinking may contribute to the mechanical properties and the heat and deformation resistance of the polymer composition.

In embodiments, wherein the insulation layer comprises no crosslinking agent, the electrical conductivity as described under the "Determination method" is measured from a sample of polymer composition forming the insulation layer which is non-crosslinked (i.e. does not contain a crosslinking agent and has not been crosslinked with a crosslinking agent). In embodiments wherein the insulation layer is crosslinked with a crosslinking agent, then the electrical conductivity is measured from a sample of the crosslinked polymer composition (i.e. a sample of the polymer composition is first crosslinked with the crosslinking agent initially present and then the electrical conductivity is measured from the obtained crosslinked sample).

The amount of the crosslinking agent used, if present, can vary within the ranges given below. For example a peroxide may be used in an amount of 0 to 110 mmol —O—O—/kg polymer composition of the insulation layer, such as 0 to 90 mmol —O—O—/kg polymer composition (corresponds 0 to 2.4 wt % of dicumyl peroxide based on the polymer composition), for example of 0 to 37 mmol —O—O—/kg polymer composition, especially of 0 to 35 mmol —O—O—/kg polymer composition, such as of 0 to 34 mmol —O—O—/kg polymer composition, for example of 0 to 33 mmol —O—O—/kg polymer composition, especially from 0 to 30 mmol —O—O—/kg polymer composition, such as from 0 to 20 mmol —O—O—/kg polymer composition, for example from 0 to 10.0 mmol —O—O—/kg polymer composition, especially from 0 to 7.0 mmol —O—O—/kg polymer composition, such as less than 5.0 mmol —O—O—/kg polymer composition, for example the polymer composition comprises no crosslinking agent (=0 wt % of added crosslinking agent). The insulation layer is thus ideally free of byproducts of the decomposition of the peroxide.

The lower limit of the crosslinking agent, if present, is not limited and can be at least 0.1 mmol —O—O—/kg polymer composition in the insulation layer, such as at least 0.5 mmol —O—O—/kg polymer composition, for example at least 5.0 mmol —O—O—/kg polymer composition. The lower peroxide content can shorten the required degassing step of the produced and crosslinked cable, if desired.

The unit "mmol —O—O—/kg polymer composition" means herein the content (mmol) of peroxide functional groups per kg polymer composition, when measured from the polymer composition prior to crosslinking. For instance the 35 mmol —O—O—/kg polymer composition corresponds to 0.95 wt % of the well-known dicumyl peroxide based on the total amount (100 wt %) of the polymer composition.

The polymer composition may comprise one type of peroxide or two or more different types of peroxide, in which case the amount (in mmol) of —O—O—/kg polymer composition, as defined above, below or in claims, is the sum of the amount of —O—O—/kg polymer composition of each peroxide type. As non-limiting examples of suitable organic peroxides, di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl) peroxide, dicumylperoxide, butyl-4,4-bis(tert-butylperoxy)-valerate, 1,1-bis(tert-butylperoxy)-3,3,5-trimethylcyclohexane, tert-butylperoxybenzoate, dibenzoylperoxide, bis(tert butylperoxyisopropyl)benzene, 2,5-dimethyl-2,5-di(benzoylperoxy)hexane, 1,1-di(tert-butylperoxy)cyclohexane, 1,1-di(tert amylperoxy)cyclohexane, or any mixtures thereof, can be mentioned. For example, the peroxide may be selected from 2,5-di(tert-butylperoxy)-2,5-dimethylhexane, di(tert-butylperoxyisopropyl)benzene, dicumylperoxide, tert-butylcumylperoxide, di(tert-butyl)peroxide, or mixtures thereof. In one embodiment, the peroxide is dicumylperoxide.

In an alternative embodiment the insulation layer is not crosslinked. In such cases, the insulation layer will generally comprise no crosslinking agent. The prior art drawbacks relating to the use of a crosslinking agent in a cable layer can therefore be avoided. Naturally, the non crosslinked embodiment also simplifies the cable production process. As no crosslinking agent is required, the raw material costs are lower. No peroxide initiated scorch will be formed. Also, it is generally required to degas a cross-linked cable layer to remove the by-products of the peroxide after crosslinking. Where the material is not crosslinked, no such degassing step is required.

The insulation layer may contain, in addition to the polymer composition and the optional peroxide, further component(s) such as additives (such as any of antioxidant(s), scorch retarder(s) (SR), crosslinking booster(s), stabiliser(s), processing aid(s), flame retardant additive(s), water tree retardant additive(s), acid or ion scavenger(s), inorganic filler(s), dielectric liquids and voltage stabilizer(s), as known in the polymer field.

The insulation layer may therefore comprise conventionally used additive(s) for W&C applications, such as one or more antioxidant(s) and optionally one or more scorch retarder(s), for example at least one or more antioxidant(s).

The used amounts of additives are conventional and well known to a skilled person, e.g. 0.1 to 1.0 wt %.

As non-limiting examples of antioxidants e.g. sterically hindered or semi-hindered phenols, aromatic amines, aliphatic sterically hindered amines, organic phosphites or phosphonites, thio compounds, and mixtures thereof, can be mentioned.

In one embodiment, the insulation layer does not comprise a carbon black. The insulation layer generally does not comprise flame retarding additive(s), e.g. a metal hydroxide containing additives in flame retarding amounts.

The polymer composition of the invention preferably has an electrical conductivity of 40 fS/m or less, more preferably of 35 fS/m or less, more preferably of 30 fS/m or less, such as 0.1 fS/m to 30 fS/m more preferably of 0.5 fS/m to 25 fS/m, when measured at 30 kV/mm according to DC conductivity method as described under "Determination Methods".

Furthermore, the polymer composition of the invention preferably has an electrical conductivity of 70 fS/m or less, more preferably of 50 fS/m or less, more preferably of 40 fS/m or less, such as 0.1 fS/m to 40 fS/m more preferably of 0.5 fS/m to 30 fS/m, when measured at 45 kV/mm according to DC conductivity method as described under "Determination Methods".

Furthermore, the polymer composition of the invention preferably has an electrical conductivity of 80 fS/m or less, more preferably of 60 fS/m or less, more preferably of 40 fS/m or less, such as 0.1 fS/m to 40 fS/m more preferably of 0.5 fS/m to 30 fS/m, when measured at 60 kV/mm according to DC conductivity method as described under "Determination Methods".

The cable of the invention may also contain inner and outer semiconductive layers. These can be made of any conventional material suitable for use in these layers. The inner and the outer semiconductive compositions can be different or identical and may comprise a polymer(s) which is, for example, a polyolefin or a mixture of polyolefins and a conductive filler, such as carbon black. Suitable polyolefin (s) are e.g. polyethylene produced in a low pressure process or a polyethylene produced in a HP process (LDPE). The general polymer description as given above in relation to the LDPE a) applies also for the suitable polymers for semiconductive layers. The carbon black can be any conventional carbon black used in the semiconductive layers of a DC power cable, such as in the semiconductive layer of a DC power cable. The carbon black may have one or more of the following properties: a) a primary particle size of at least 5 nm which is defined as the number average particle diameter according ASTM D3849-95a, dispersion procedure D b) iodine number of at least 30 mg/g according to ASTM D1510, c) oil absorption number of at least 30 ml/100 g which is measured according to ASTM D2414. Non-limiting examples of carbon blacks are e.g. acetylene carbon black, furnace carbon black and Ketjen carbon black, such as furnace carbon black and acetylene carbon black. The polymer composition can comprise 10 to 50 wt % carbon black, based on the weight of the Semiconductive composition.

In one embodiment, the outer semiconductive layer is cross-linked. In another embodiment, the inner semiconductive layer is non-crosslinked. For example, the inner semiconductive layer and the insulation layer may remain non crosslinked where the outer semiconductive layer is cross-linked. A peroxide crosslinking agent can therefore be provided in the outer semiconductive layer only.

The cable comprises one or more conductors. Each conductor may comprise one or more conductors, .e.g. wires.

For example, each conductor is an electrical conductor and comprises one or more metal wires. Cu or Al wire is preferred.

As well known the cable can optionally comprise further layers, e.g. screen(s), a jacketing layer(s), other protective layer(s) or any combinations thereof.

Cable Manufacture

The invention also provides a process for producing a cable comprising the steps of
- applying on a conductor, such as by (co)extrusion, at least an insulation layer, wherein the insulation layer comprises a polymer composition comprising an LDPE, the PP and the compatibiliser. In one embodiment the process comprises the steps of
- applying on a conductor, such as by (co)extrusion, an inner semiconductive layer, an insulation layer and an outer semiconductive layer, in that order, wherein the insulation layer comprises a polymer composition comprising an LDPE, the PP and the compatibiliser. The insulation layer may be not crosslinked.

The process may optionally comprise the steps of crosslinking one or both of the inner semiconductive layer or outer semiconductive layer, without crosslinking the insulation layer. In one embodiment, the outer semiconductive layer is crosslinked, without crosslinking the insulation layer. Furthermore, the inner semiconductive layer may be not crosslinked. Thus, the semi-conductive layer may comprise a peroxide which enables the crosslinking of the semi-conductive composition.

In one embodiment, a cable is produced, wherein the process comprises the steps of
(a)—providing and mixing, such as melt mixing in an extruder, an optionally crosslinkable first semiconductive composition comprising a polymer, a carbon black and optionally further component(s) for the inner semiconductive layer,
  providing and mixing, such as melt mixing in an extruder, the optionally crosslinkable polymer composition of the invention; and
  providing and mixing, such as melt mixing in an extruder, a second semiconductive composition which is optionally crosslinkable and comprises a polymer, a carbon black and optionally further component(s) for the outer semiconductive layer,
(b) applying on a conductor, preferably by coextrusion,
  a melt mix of the first semiconductive composition obtained from step (a) to form the inner semiconductive layer,
  a melt mix of polymer composition of the invention obtained from step (a) to form the insulation layer, and
  a melt mix of the second semiconductive composition obtained from step (a) to form the outer semiconductive layer, and
(c) optionally crosslinking at crosslinking conditions one or both of the first semiconductive composition of the inner semiconductive layer and the second semiconductive composition of the outer semiconductive layer, of the obtained cable, and optionally crosslinking the insulation layer, for example without crosslinking the insulation layer.

In step (c) the second semiconductive polymer composition of the outer semiconductive layer may be crosslinked, for example crosslinked without crosslinking the insulation layer. Furthermore, the second semiconductive polymer composition of the outer semiconductive layer can be crosslinked, without crosslinking the insulation layer or the first semiconductive composition of the inner semiconductive layer.

Melt mixing means mixing above the melting point of at least the major polymer component(s) of the obtained mixture and is carried out for example, without limiting to, in a temperature of at least 15° C. above the melting or softening point of polymer component(s).

The term "(co)extrusion" means herein that in case of two or more layers, said layers can be extruded in separate steps, or at least two or all of said layers can be coextruded in a same extrusion step, as well known in the art. The term "(co)extrusion" means herein also that all or part of the layer(s) are formed simultaneously using one or more extrusion heads. For instance a triple extrusion can be used for forming three layers. In case a layer is formed using more than one extrusion heads, then for instance, the layers can be extruded using two extrusion heads, the first one for forming the inner semiconductive layer and the inner part of the insulation layer, and the second head for forming the outer insulation layer and the outer semiconductive layer.

As well known, the polymer of the invention and the optional and preferred first and second semiconductive compositions can be produced before or during the cable production process.

The polymers required to manufacture the cable of the invention may be provided to the cable production process in form of powder, grain or pellets. Pellets mean herein generally any polymer product which is formed from reactor-made polymer (obtained directly from the reactor) by post-reactor modification to a solid polymer particles.

The (melt) mixing step (a) of the provided polymer composition of the invention and of the preferable first and second semiconductive compositions may be carried out in a cable extruder. The step a) of the cable production process may optionally comprise a separate mixing step, e.g. in a mixer arranged in connection and preceding the cable extruder of the cable production line. Mixing in the preceding separate mixer can be carried out by mixing with or without external heating (heating with an external source) of the component(s).

Any crosslinking agent can be added before the cable production process or during the (melt) mixing step (a). For instance, the crosslinking agent and also the optional further component(s), such as additive(s), can already be present in the polymers used. The crosslinking agent is added, such as impregnated, onto the solid polymer particles, e.g. pellets.

The melt mix of the polymer composition obtained from (melt)mixing step (a) may consist of the polymer composition of the invention as the sole polymer component(s). The optional and preferable additive(s) can be added to polymer composition as such or as a mixture with a carrier polymer, i.e. in a form of so-called master batch.

The optional crosslinking can be carried out at increased temperature which is chosen, as well known, depending on the type of crosslinking agent. For instance temperatures above 150° C., such as from 160 to 350° C., are typical, however without limiting thereto.

The processing temperatures and devices are well known in the art, e.g. conventional mixers and extruders, such as single or twin screw extruders, are suitable for the process of the invention.

The advantages of the embodiment of having the semiconductive layers and the insulation layer non-crosslinked include:
  Optimal electrical performance of the insulation system of the HV DC cable.

The connection of cables is very feasible due to non-crosslinked thermoplastic insulation composition.

No need to wait and allow the heat to transfer through the insulation and semiconductive layers, since not cross-linked. The overall production efficiency is improved, especially in HV applications with thick insulation layer, since the semiconductive layers and the insulation layer need not to be crosslinked.

Robust high speed extrusion possible leading to longer stable production periods at higher extrusion speed and quality due to no risk to scorching (undesired premature crosslinking) in the semiconductive and insulation layers.

Degassing step can be eliminated, and thus accelerate the overall cable production process, since no undesired by-products, i.e. decomposition products, formed from the crosslinking agent are formed.

Further, the polymer compositions, according to the present invention, comprising a blend of an LDPE with polypropylene (PP) and a compatibiliser, offers remarkably low conductivity, as well as, improved thermomechanical performance, i.e. higher thermomechanical performance than neat LDPE are obtained.

The thickness of the insulation layer of the cable, e.g. the DC power cable such as HVDC power cable, is typically 2 mm or more, such as at least 3 mm, for example of at least 5 to 100 mm, especially from 5 to 50 mm, for instance 5 to 40 mm, e.g. 5 to 35 mm, when measured from a cross section of the insulation layer of the cable.

The thickness of the inner and outer semiconductive layers is typically less than that of the insulation layer, and in HVDC power cables can be e.g. more than 0.1 mm, such as from 0.3 up to 20 mm, 0.3 to 10 of inner semiconductive and outer semiconductive layer. The thickness of the inner semiconductive layer can be 0.3-5.0 mm, such as 0.5-3.0 mm, for example 0.8-2.0 mm. The thickness of the outer semiconductive layer can be from 0.3 to 10 mm, such as 0.3 to 5 mm, for example 0.5 to 3.0 mm, especially 0.8-3.0 mm. It is evident for and within the skills of a skilled person that the thickness of the layers of the DC cable depends on the intended voltage level of the end application cable and can be chosen accordingly.

The preferable embodiments of the invention can be combined with each other in any way to further define the invention.

The invention will now be described with reference to the following non limiting examples and FIGURE.

FIG. 1 (and Table 2) shows the conductivity results for Inventive compositions (IE 1) and (IE 2) and Comparative composition (CE 1).

Determination Methods

Unless otherwise stated in the description or experimental part the following methods were used for the property determinations.

Wt %: % by weight

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene and at 230° C. for polypropylene. MFR may be determined at different loadings such as 2.16 kg ($MFR_2$), 5.0 kg ($MFR_5$) or 21.6 kg ($MFR_{21}$).

Molecular Weight

Mz, Mw, Mn, and MWD are measured by Gel Permeation Chromatography (GPC) according to the following method:

The weight average molecular weight Mw and the molecular weight distribution (MWD=Mw/Mn wherein Mn is the number average molecular weight and Mw is the weight average molecular weight; Mz is the z-average molecular weight) is measured according to ISO 16014-4: 2003 and ASTM D 6474-99. A Waters GPCV2000 instrument, equipped with refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert-butyl-4-methyl-phenol) as solvent at 140° C. and at a constant flow rate of 1 mL/min. 209.5 µL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants were used as given in ASTM D 6474-99. All samples were prepared by dissolving 0.5-4.0 mg of polymer in 4 mL (at 140° C.) of stabilized TCB (same as mobile phase) and keeping for max. 3 hours at a maximum temperature of 160° C. with continuous gentle shaking prior sampling in into the GPC instrument.

Density

Low density polyethylene (LDPE): The density was measured according to ISO 1183-2. The sample preparation was executed according to ISO 1872-2 Table 3 Q (compression moulding).

Xylene Solubles (XS)

Xylene solubles were determined at 23° C. according ISO 6427.

DC Conductivity Method

Circular plaques were compression moulded from pellets of the test polymer composition, i.e. the polymer composition of the present invention, using a 0.5 mm thick stainless steel frame with a 330 mm circular hole. The final plaques therefore had a thickness of 0.5 mm and a diameter of 330 mm Mylar films were placed between the polymer and the press surfaces.

The test polymer composition was then press-moulded at 130° C. for 60 s at a pressure of 2 MPa. Thereafter the pressure was increased to 20 MPa while the temperature gradually increased to reach 180° C. after 200 s. The temperature was kept constant at 180° C. for 340 s during which the plaque became fully crosslinked by means of the peroxide, if present in the test polymer composition. Finally, the temperature decreased with a cooling rate of 15° C./min until room temperature was reached and the pressure was released.

A high voltage source was connected to the upper electrode, to apply voltage over the test sample. The resulting current through the sample, i.e. sample of the polymer composition of the present invention, was measured with an electrometer. The measurement cell was a three electrodes system with brass electrodes placed in an oven at 70° C. The diameter of the measurement electrode was 100 mm.

A DC voltage of 15 kV was applied leading to a mean electric field of 30 kV/mm. The current through the plaque, i.e. the polymer composition of the present invention, was logged for 11 hours and the current at that time was used to calculate the conductivity of the insulation at 30 kV/mm. The voltage was then increased to 22.5 kV leading to a mean electric field of 45 kV/mm. The current through the plaque, i.e. the polymer composition of the present invention, was logged for 6 hours and the current at that time was used to calculate the conductivity of the insulation at 45 kV/mm. The voltage was then increased to 30 kV leading to a mean electric field of 60 kV/mm. The current through the plaque, i.e. the polymer composition of the present invention, was logged for 6 hours and the current at that time was used to calculate the conductivity of the insulation at 60 kV/mm.

Dynamic Mechanical Thermal Analysis (DMTA)

Dynamic Mechanical Thermal Analysis (DMTA) was performed using the torsion rectangular setup according to ISO 6721-7. Temperature was increased at a rate of 2 K/min from −50° C. until melting was reached. The frequency was 1 Hz.

Experimental Part

The following materials were used:

Low density polyethylene, i.e. LDPE polymer—A commercially available low density polyethylene ($LDPE_{930}$), i.e. Bormed™ LE6609-PH with density 930 kg/m³, available from Borealis Polyolefine GmbH (Austria), is included in all Inventive Examples 1 and 2 and Comparative Example (i.e. IE 1, IE 2 and CE 1).

Polypropylene (PP) A commercially available heterophasic copolymers comprising a propylene random copolymer as matrix phase (RAHECO), i.e. Bormed™ SC876CF available from Borealis Polyolefine GmbH (Austria), is included in both Inventive Examples 1 and 2 (IE 1 and IE 2).

Compatibiliser

A commercially available multimodal ethylene copolymer (LLDPE), i.e. Anteo™ FK1820A available from Borouge Pte Ltd (Singapore), is included in Inventive Example (IE 1).

A commercially available olefin block copolymer ("Copolymer") INFUSE™ 9807 available from DowDuPont (Olefin Block Copolymer) having a density of 866 kg/m³, is included in Inventive Example (IE 2).

The low density polyethylene, i.e. LDPE polymer: Here the commercially available LDPE polymer (LDPE homopolymer, $LDPE_{930}$) has the properties of Table 1:

TABLE 1

Polymer properties of LDPE (LDPE homopolymer, $LDPE_{930}$)

| Base Resin Properties | LDPE |
| --- | --- |
| $MFR_2$, 190° C. [g/10 min] | 0.3 |
| Density [kg/m³] | 930 |
| Tensile modulus | 350 MPa |
| Flex Modulus | 330 MPa |

TABLE 2

Polymer compositions of the invention (IE 1 and IE 2) and reference (comparative) compositions (CE 1), and also the electrical conductivity results of the polymer compositions:

|  | CE 1 | IE 1 | IE 2 |
| --- | --- | --- | --- |
| $LDPE_{930}$ [wt. %] | 100 | 94 | 94 |
| LLDPE [wt. %] | 0 | 1 | 0 |
| Copolymer [wt. %] | 0 | 0 | 1 |
| PP [wt. %] | 0 | 5 | 5 |
| DC conductivity at 90° C. [fS/m] |  |  |  |
| 30 kV/mm | 41.9 | 23.2 | 19.5 |
| 45 kV/mm | 72.8 | 26.2 | 23.1 |
| 60 kV/mm | 87.4 | 27.6 | 25.4 |
| Melting point DMTA [° C.] | 116 | 120 | 120 |

Melting point DMTA is defined as the temperature where the storage shear modulus, G' is 2 MPa.

Examples

As can be seen from Table 2, polymer compositions of inventive examples (IE 1 and IE 2) show excellent low DC conductivity. Furthermore, the DC conductivity drops significantly when the pure LDPE is enhanced in accordance with the invention. The polymer compositions of the invention are particularly useful in DC power cables, preferably in HV DC power cables.

Further, the higher thermomechanical performance is illustrated in Table 2 herein. As can be seen the effective melting point of the LDPE/PP blends, i.e. of the polymer compositions of the invention, is about 4° C. degrees higher than for same LDPE without PP. This, may not be regarded to be a huge difference, however for HVDC cables, where the maximum overload temperature is −105° C., such an improvement can be of significant importance. This may offer the possibility to use thermoplastic LDPE based blends for future HVDC insulation.

The invention claimed is:

1. A cable comprising one or more conductors surrounded by at least an insulation layer, wherein said insulation layer comprises a polymer composition comprising:
    a) at least 55 wt % of a low density polyethylene (LDPE), wherein the LDPE is a low density polyethylene (LDPE) homopolymer;
    b) 1.0 to 40 wt % of polypropylene (PP), wherein the PP is a polypropylene copolymer (PP) and;
    c) 0.25 to 10 wt % of a compatibilizer, wherein the compatibilizer is a linear low density polyethylene (LLDPE).

2. The cable as claimed in claim 1, wherein the conductivity of the polymer composition is 40 fS/m or less, when measured at 30 kV/mm according to DC conductivity method.

3. The cable as claimed in claim 1, wherein the conductivity of the polymer composition is 70 fS/m or less, when measured at 45 kV/mm according to DC conductivity method.

4. The cable as claimed in claim 1, wherein the conductivity of the polymer composition is 80 fS/m or less, when measured at 60 kV/mm according to DC conductivity method.

5. The cable as claimed in claim 1, wherein the conductivity of the polymer composition is at least 10% lower than the conductivity of an otherwise identical polymer composition comprising neither the PP nor the compatibilizer, when measured according to DC conductivity method at an electrical stress which is 30 kV/mm or more.

6. The cable as claimed in claim 1, wherein the PP is a random copolymer of propylene or a heterophasic copolymer of propylene.

7. The cable as claimed in claim 1, wherein the PP is a heterophasic copolymer comprising a propylene random copolymer as a matrix phase (RAHECO) or a heterophasic copolymer having a propylene homopolymer as a matrix phase (HECO).

8. The cable as claimed in claim 1, wherein the melting point (DMTA) of the polymer composition, which is defined as the temperature where the storage shear modulus, G', is 2 MPa, is at least 118° C.

9. The cable as claimed in claim 1, wherein the polymer composition is non crosslinked.

10. The cable as claimed in claim 9, wherein the non-crosslinked polymer composition comprises:
   a) at least 55 wt % of the LDPE, wherein the LDPE is a low density polyethylene (LDPE) homopolymer;
   b) 1 to 40 wt % of the PP, wherein the PP is a heterophasic polypropylene copolymer or random heterophasic polypropylene copolymer (PP); and
   c) 0.25 to 10 wt % of the compatibilizer, wherein the compatibilizer is an LLDPE.

11. The cable as claimed in claim 1, which is a power cable.

12. The cable as claimed in claim 1, wherein the PP b) is present in an amount of from 1 to 20 wt % relative to the total weight of the polymer composition as a whole.

13. The cable as claimed in claim 1, wherein the compatibilizer c) is present in an amount of from 0.5 to 5 wt % relative to the total weight of the polymer composition as a whole.

14. A process for producing the cable as claimed in claim 1, comprising the step of: applying on a conductor at least an insulation layer comprising a polymer composition comprising:
   a) a low density polyethylene (LDPE);
   b) polypropylene (PP); and
   c) a compatibilizer selected from is a linear low density polyethylene (LLDPE) or an olefin block copolymer.

* * * * *